USO12025762B2

(12) United States Patent
Selvakumar

(10) Patent No.: US 12,025,762 B2
(45) Date of Patent: Jul. 2, 2024

(54) MOTION AWARE NODAL SEISMIC UNIT AND RELATED METHODS

(71) Applicant: INOVA LTD., George Town (KY)

(72) Inventor: Arjun Selvakumar, Houston, TX (US)

(73) Assignee: Inova Ltd., Grand Cayman (KY)

( * ) Notice: Subject to any disclaimer, the term of this patent is extended or adjusted under 35 U.S.C. 154(b) by 0 days.

(21) Appl. No.: 17/920,357

(22) PCT Filed: Apr. 21, 2021

(86) PCT No.: PCT/US2021/028400
§ 371 (c)(1),
(2) Date: Oct. 20, 2022

(87) PCT Pub. No.: WO2021/216711
PCT Pub. Date: Oct. 28, 2021

(65) Prior Publication Data
US 2023/0168403 A1 Jun. 1, 2023

Related U.S. Application Data

(60) Provisional application No. 63/013,274, filed on Apr. 21, 2020.

(51) Int. Cl.
G01V 1/22 (2006.01)
G01V 1/16 (2006.01)

(52) U.S. Cl.
CPC .............. G01V 1/223 (2013.01); G01V 1/164 (2013.01); G01V 1/168 (2013.01); G01V 2210/1425 (2013.01)

(58) Field of Classification Search
CPC ........ G01V 1/223; G01V 1/164; G01V 1/168; G01V 2210/1425; G01V 2200/10; G01V 1/003
See application file for complete search history.

(56) References Cited

U.S. PATENT DOCUMENTS

2008/0080307 A1* 4/2008 Eperjesi ................. G01V 1/223
367/137
2013/0016625 A1* 1/2013 Murias .................... H04W 4/38
370/254
2014/0207721 A1* 7/2014 Filson .................. G08B 27/006
706/46

(Continued)

FOREIGN PATENT DOCUMENTS

| CA | 3176335 A1 * | 10/2021 | ............. G01V 1/003 |
| CN | 103946732 A * | 7/2014 | ......... G02B 27/0093 |
| WO | WO-2021216711 A1 * | 10/2021 | ............. G01V 1/003 |

Primary Examiner — Daniel Pihulic
(74) Attorney, Agent, or Firm — Crowe & Dunlevy, P.C.

(57) ABSTRACT

A nodal seismic unit for acquiring seismic information includes an enclosure, a GPS receiver disposed in the enclosure; a motion sensor disposed in the enclosure; a LPWAN radio transceiver disposed in the enclosure; and a control unit disposed in the enclosure. The control unit is configured to transmit an unplanned movement signal to a remote operator using the LPWAN radio transceiver if the control unit receives a signal from the motion sensor indicative of an acceleration greater than a preset level. Additionally, the control unit may be configured to change an operating state of the nodal seismic unit in response to detecting a predetermined pattern of motion using the motion sensor.

14 Claims, 3 Drawing Sheets

(56) References Cited

U.S. PATENT DOCUMENTS

2019/0383958 A1* 12/2019 Jamali Rad ............ G01V 1/223
2023/0168403 A1*  6/2023 Selvakumar ........... G01V 1/003
                                                   367/14

* cited by examiner

MOTION AWARE NODAL SEISMIC UNIT AND RELATED METHODS

BACKGROUND OF THE DISCLOSURE

Field of the Disclosure

This disclosure generally relates to systems and methods for conducting seismic data acquisition activities.

Background of the Art

Seismic surveys are conducted to map subsurface structures to identify and develop oil and gas reservoirs. Seismic surveys are typically performed to estimate the location and quantities of oil and gas fields prior to developing the fields and also to determine the changes in the reservoir over time subsequent to the drilling of wells. On land, seismic surveys are conducted by deploying an array of seismic sensors over selected geographical regions. The seismic sensors are placed or coupled to the ground in the form of a grid. An energy source is used at selected predetermined locations in the geographical area to generate or induce acoustic waves or signals into the subsurface. The acoustic waves generated into the subsurface reflect back to the surface from subsurface formation discontinuities, such as those formed by oil and gas reservoirs. The reflections are sensed or detected at the surface by the seismic sensors and recorded. The sensing, processing and recording of the seismic waves is referred to as seismic data acquisition. Two-dimensional and/or three-dimensional maps of the subsurface structures are generated from the recorded seismic data. These maps are then used to make decisions about drilling locations, reservoir size, pay zone depth and estimates of the production of hydrocarbons.

Conventionally, seismic surveys are performed using cabled sensors and/or nodal sensors. Nodal sensors are generally self-contained units and are not connected to one another using physical carriers such as cables. Nodal sensors have advantages over cabled sensors such as lighter weight, easier deployment, lower cost of operations, and competitive capital cost levels. However, adoption of nodal sensors has been slowed by the limited access to real-time or near-real time information regarding the health, condition and location of the nodal sensor after initial deployment in the field. Thus, a remote operator may not be aware of unplanned movement of a nodal sensor. For example, theft of nodal sensors left unattended in the field may go unnoticed by a remote operator, which then discourages their use for a seismic survey.

The present disclosure provides methods and devices for obtaining a status of a nodal sensor after deployment in a field of interest.

SUMMARY OF THE DISCLOSURE

In aspects, the present disclosure provides a nodal seismic unit for acquiring seismic information. The nodal seismic unit may include an enclosure, a GPS receiver disposed in the enclosure; a motion sensor disposed in the enclosure; a LPWAN radio transceiver disposed in the enclosure; and a control unit disposed in the enclosure. The control unit may be configured to transmit an unplanned movement signal to a remote operator using the LPWAN radio transceiver if the control unit receives a signal from the motion sensor indicative of an acceleration greater than a preset level. Additionally, the control unit may be configured to change an operating state of the nodal seismic unit in response to detecting a predetermined pattern of motion using the motion sensor.

Examples of certain features of the systems, methods and apparatus disclosed herein have been summarized rather broadly in order that detailed description thereof that follows may be better understood, and in order that the contributions to the art may be appreciated. There are, of course, additional features of the disclosure that will be described hereinafter and will form the subject of the disclosure. The summary provided herein is not intended to limit the scope.

BRIEF DESCRIPTION OF THE DRAWINGS

The novel features of this disclosure, as well as the disclosure itself, will be best understood from the attached drawings, taken along with the following description, in which similar reference characters generally refer to similar elements, and in which.

DETAILED DESCRIPTION OF THE EMBODIMENTS

The present disclosure relates to devices and methods for providing remote operators with information regarding the position, location, and health of nodal seismic units. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein.

Figure 1:
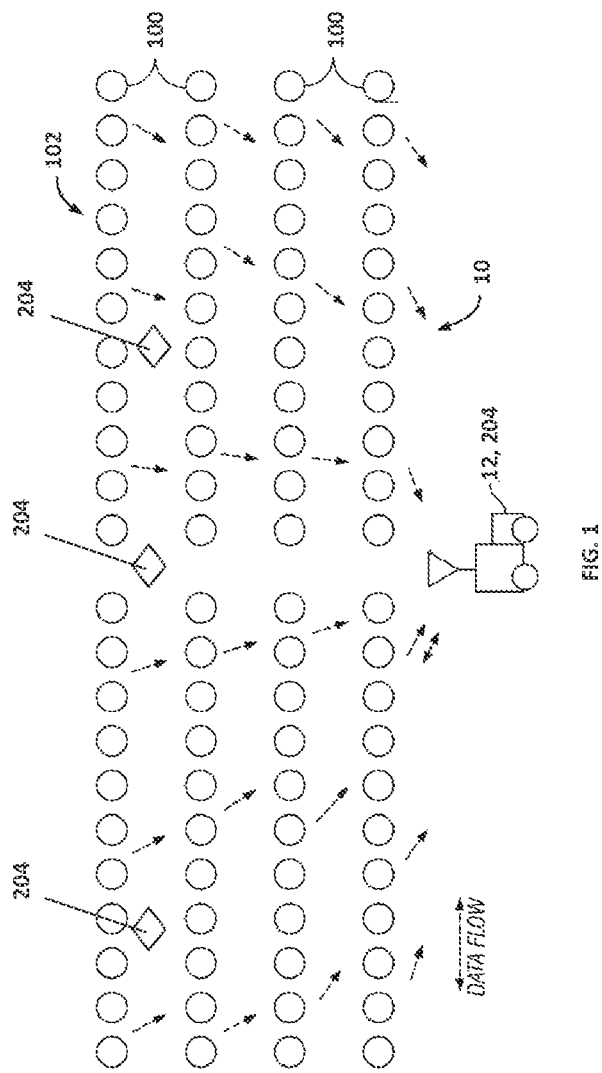
FIG. 1 shows a seismic spread using nodal seismic units made in accordance with one embodiment of the present disclosure.

FIG. 1 illustrates one non-limiting seismic survey system 10 that uses nodal seismic units, some of which are labeled with numeral 100. The system 10 may includes a command center 12 in communication with each nodal seismic unit 100, thereby forming an array 102 for seismic data acquisition. Each nodal seismic unit 100 may include one or more sensors (not shown) for sensing seismic energy. In one embodiment, the data flow, as depicted by dashed arrows, can be bi-directional for allowing command and control instructions to be sent from the command center 12 to each nodal sensing units 100 and for quality control and/or selected pre-processed seismic information to flow from each nodal seismic unit 100 to the command center 12.

In another embodiment, one or more communication modules 204 convey signals between any nodal seismic units 100 within its signal field and the command center 12. The communication module 204 may include a router, gateway, battery power, microprocessors, and/or other signal transmission equipment and software. The communication media used by the communication modules 204 may include internet communication, radio signals, or any other wireless signal transmission media. Additionally, in some embodiments, the communication modules 204 may include memory modules to locally store information. Also, the communication modules 204 may include an interface, displays, and control algorithms that enable local, or in situ, interaction between a communication module 204 and nodal seismic units 100 within its field of communication. In still other embodiments, one or more of the communication modules 204 may include an interface, displays, and control algorithms that enable local, or in situ, interaction between a communication module 204 and nodal seismic units 100 within its field of communication and also the remainder of the array 102. Thus, one or more communication modules 204 may also act as a command center 12.

Figure 2:
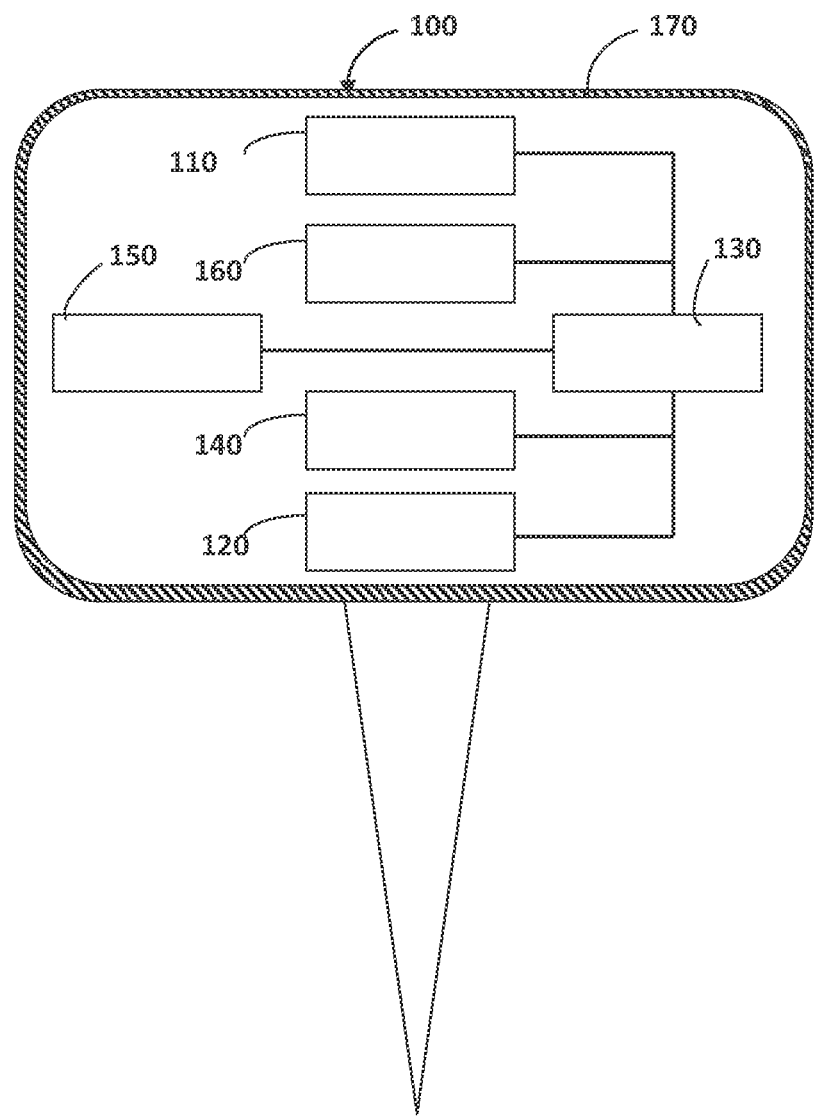
FIG. 2 is a representation of a nodal seismic unit made in accordance with one embodiment of the present disclosure.

FIG. 2 illustrates one non-limiting embodiment of a nodal seismic unit 100 in accordance with the present disclosure. The nodal seismic unit 100 uses low power and long-range radio technology in conjunction with other motion sensors and GPS receivers to detect unplanned movement, such as theft, of the nodal seismic unit 100 and transmit messages alerting a remote operator. In one arrangement, the nodal seismic unit 100 may include a GPS receiver 110, a motion sensor 120, a control unit 130, an internal oscillator 150, and a LPWAN radio transceiver 150. Additionally, a battery 160 may be used to supply power to onboard components of the nodal seismic unit 100. All of these components may be enclosed in a suitable enclosure 170.

The nodal seismic unit 100 may be configured to have several discrete operating states, each of which has different levels of functionality and which consumes different amounts of power. Illustrative, but not exhaustive, operating states include "off," "sleep," "full power," and "beacon." In the "off" state, the nodal seismic device 100 is completely de-energized and does not perform any functions. In a "sleep" state, only the components and circuitry necessary to sense and implement a change in an operating state are energized. In the "full power" state, the nodal seismic unit 100 is able to detect and record seismic signals, communicate with a remote operator, and perform other assigned functions. In the "beacon" state, the nodal seismic unit 100 only the components necessary to determine and transmit position/location information and other status information are energized either continuously or periodically, as further described below.

The GPS receiver 110 is configured to obtain accurate timing and position of the nodal seismic unit 100 when deployed in the field. The information from the GPS receiver 110 may used to discipline the internal oscillator 150 and help time stamp the acquired seismic data.

The motion sensor 120 may be an three-axis inertial accelerometer package configured to detect orientation and motion of nodal seismic unit 100. The output of the motion sensor 120 may be used to initiate a "wake up" sequence during which the nodal seismic unit 100 transitions from the "sleep" state to the "full power" state during which seismic information can be recorded. Thus, aside from the "off" state, the motion sensor 120 are always energized so as to generate output signals irrespective of whether other components in the nodal seismic unit 100 are in the "sleep" state or otherwise de-energized.

The LPWAN radio transceiver 140 uses LPWAN radio technology, which can relay information over several kilometers or more to a radio receiver, e.g., the command center 12 (FIG. 1). A low-power wide-area network (LPWAN) enables long-range wireless at a low bit rate. Typically, a LPWAN data rate can range between 0.3 kbit/s and 50 kbit/s per channel.

The control unit 130 may be configured to operate the nodal seismic unit 100 autonomously and/or with received command signals. To perform one or more tasks in the field, the control unit 130 may include micro-processors programmed with algorithms, memory modules, circuitry, etc.

In embodiments, the control unit 130 may be configured to change the operating state of the nodal seismic unit 130 upon detecting a predetermined movement of the nodal seismic unit 130. The predetermined movement may be a rotation of the nodal seismic unit 100; e.g., two clockwise rotations, one clockwise rotation and one counter clockwise rotation, etc. For example, the nodal seismic unit 130 may be in the "sleep" state in which only the motion sensor 120 and the control unit 130 are energized. When the control unit 130 receives signals from the motion sensor 120 indicative of the predetermined motion, the control unit 130 transitions the nodal seismic unit 100 from the "sleep" state to the "full power" state to conduct seismic recordings.

Generally, once the nodal seismic unit 100 is awoken, planted into the ground, and deployed in the field, the nodal seismic unit 100 rarely senses any gravitational signal exceeding 0.5 G to 1 G, wherein the unit 'G' refers to the gravitational field of the Earth. However, the nodal seismic unit 100 will experience several G's when extracted from the planted state. The present teachings recognize that the relatively higher acceleration is not typical of routine recording mode wherein the G levels are below 1 G. Thus, the control unit 130 may be programmed to monitor the 'G' levels using a preset threshold acceleration level; e.g., greater 2 G, 3 G, 4 G, etc. If the preset threshold acceleration level is exceeded, then the control unit 130 may transmit a signal indicating unplanned movement to a remote operator.

In embodiments, the control unit 130 may also be programmed to distinguish a planned extraction of the nodal seismic unit 100 from the field from an unintentional extraction of the nodal seismic unit 100. For example, the control unit 130 may be programmed to detect a predetermined motion that indicates that a planned extraction is imminent. The predetermined motion may be the same motion used to transition the nodal seismic unit 100 from the "sleep" state or a different predetermined motion may be used to signal that the imminent extraction is intentional. Thus, if the control unit 130 detects the predetermined motion, the control unit 130 does not transmit a signal indicating unplanned movement to a remote operator.

The control unit 130 may further be programmed to take mitigating action upon detecting an unplanned movement. For example, the control unit 130 may transition the nodal seismic unit 100 to a non-standard 'beacon' mode in which power is conserved and maintained for as long as possible. Activities unrelated to determining location and status, such as seismic recording, are stopped. The control unit 130 continuously or periodically (e.g., every fifteen minutes) determines the GPS position, orientation, and motion of the nodal seismic unit 100 and may also record this information. The control unit 130 uses the LPWAN radio transceiver 140 to report the information to the remote operator. The reporting may be done in 'real-time' or periodically using recorded information.

In embodiments, the control unit 130 may be programmed to enter operational sleep cycles in which the nodal seismic unit 100 wakes for short durations to attempt to update GPS position based on available GPS reception as well as to transmit its position and motion information to the remote operator using the LPWAN radio transceiver 120, or possibly other available radio receivers. In embodiments utilizing a radio transmitter chip that integrates Bluetooth mesh, the control unit 130 can transmit the positional and motional information not only through the LPWAN radio transceiver 140 but also shorter range mesh radio methods such that the probability of reaching the operator is improved. It should be noted that with the proliferation of LPWAN radio networks in many urban and some rural areas, it could be possible to receive these beacon messages even if the nodal seismic unit 100 is no longer within the operator's network.

In embodiments, the transmission mode of the LPWAN radio transceiver 140 could utilize periods of time where the nodal seismic unit 100 can listen for acknowledgements messages from the LPWAN gateways such that other actions can be performed, for e.g., changing the frequency of the transmission, more frequent updates of position and motion, etc.

Figure 3:
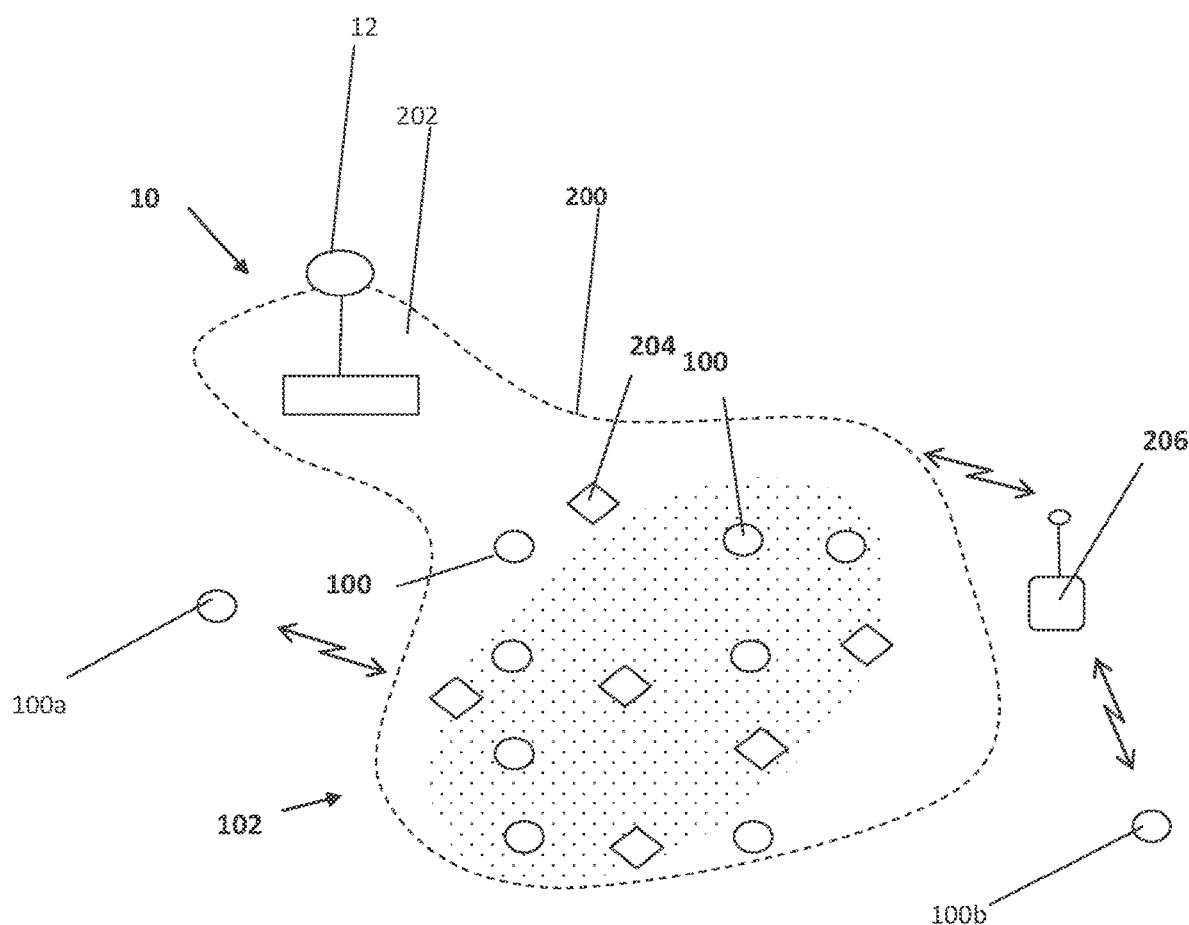
FIG. 3 illustrates a seismic survey system that uses geofencing to track nodal seismic units deployed in a geographical area of interest in accordance with one embodiment of the present disclosure.

Referring now to FIG. 3, there is shown a seismic survey system 10 that uses "geofencing" to track nodal seismic units deployed in a geographical area of interest in accordance with one embodiment of the present disclosure. one non-limiting seismic survey system 10 that uses nodal seismic units, some of which are labeled with numeral 100. The system 10 may include a command center 12 in communication with each nodal seismic unit 100, thereby forming an array 102 for seismic data acquisition. The communication may be via one more communication modules 204 that are dispersed throughout the array 102. The communication modules 204 may be configured as described previously (e.g., a router, gateway, battery power, microprocessors, signal transmission equipment etc.). Each nodal seismic unit 100 may include one or more sensors (not shown) for sensing seismic energy.

In one non-limiting embodiment, one or more of the nodal seismic units 100 may be programmed with geofence data. The geofence data defines a virtual geographic boundary or region that, along with GPS information, may be used by the nodal seismic units 100 to determine whether that nodal seismic unit 100 has entered or left a defined area or region. For example, the geofence data may define a boundary 200 within which the seismic survey activity is planned to be undertaken.

Thus, the presence of a nodal seismic unit, such as nodal seismic unit 100a, that is outside of the boundary 200 may be considered unplanned and trigger a change in operating status and/or an alert by the nodal seismic unit 100a. For example, the nodal seismic unit 100a may transition to a beacon mode. In such beacon mode, operation may be limited to saving power for purely updating location and time stamps using GPS and transmitting the position, time and identification information to any communication module 204 within range.

However, nodal seismic unit 100b, which is also outside of the boundary 200 may be too distant from a communication module 204 to enable communication with the command center 12. Nonetheless, the nodal seismic unit 100b can use any available public LPWAN radio network 206 to transmit beacon messages to the command center 12.

Figure 4:
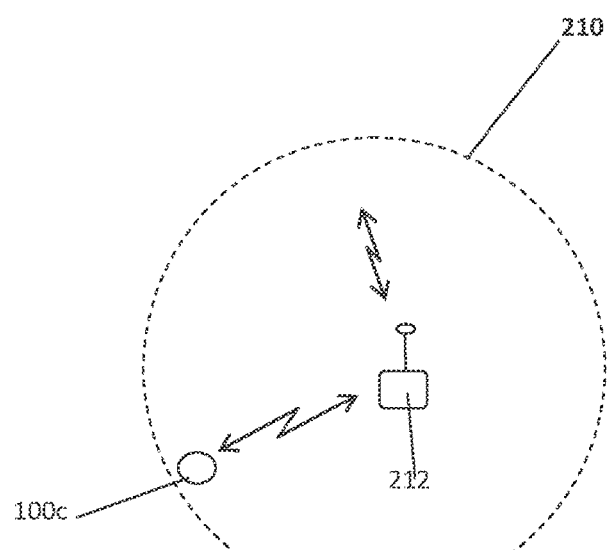
FIG. 4 illustrates a nodal seismic unit communicating with a local signal relay unit in accordance with one embodiment of the present disclosure.

Referring now to FIG. 4, there is shown a nodal seismic unit 100c that is located in an area 208 that is out of range any communication module 204 (FIG. 3) in communication with the command center 12 (FIG. 3) and any available LPWAN radio network 206 (FIG. 3). To enable communication between the nodal seismic unit 100c and the command center 12 (FIG. 3), a local signal relay unit 210 may be used. The local signal relay unit 210 may include a router and gateway to establish unidirectional or bi-directional signal communication. For example, the local signal relay unit 210 may a stationary device that is pre-positioned at one or more structures. In other arrangements, the local signal relay unit 210 may be positioned on a vehicle such as an automobile or aircraft.

The term "seismic unit" means any device that is used in a seismic spread, including, but not limited to sensors, sensor stations, receivers, transmitters, power supplies, control units, etc. As used above, a seismic spread is a network of equipment configured to detect seismic energy. As used above, a command center is a device or system used to communicate with, control, or otherwise interact with the one or more components or devices of the seismic spread. The disclosure herein is provided in reference to particular embodiments and processes to illustrate the concepts and methods. Such particular embodiments and processes are not intended to limit the scope of the disclosure or the claims. All such modifications within the scope of the claims and disclaimers are intended to be part of this disclosure.

What is claimed is:

1. A method for acquiring seismic information, comprising:
   configuring a nodal seismic unit to include at least:
   an enclosure,
   a GPS receiver disposed in the enclosure,
   a motion sensor disposed in the enclosure,
   a LPWAN radio transceiver disposed in the enclosure, and
   a control unit disposed in the enclosure;
   configuring the control unit to transmit an unplanned movement signal to a remote operator using the LPWAN radio transceiver if: (i) the control unit receives a signal from the motion sensor indicative of an acceleration greater than a preset level and (ii) the signal from the motion sensor is not a predetermined signal indicative of a planned movement; and
   deploying the nodal seismic unit into a geographical area of interest.

2. The method of claim 1, further comprising transmitting the unplanned movement signal to the remote operator if the motion sensor senses an acceleration that is greater than an acceleration encountered during recording seismic data.

3. The method of claim 1, further comprising transmitting signals from the nodal seismic unit using a mesh radio.

4. The method of claim 3, further comprising transmitting signals from the nodal seismic to the remote operator via at least one other communication unit in signal communication with the mesh radio.

5. The method of claim 1, further comprising transmitting signals from the nodal seismic unit using a public LPWAN network.

6. The method of claim 1, further comprising receiving signals at the nodal seismic unit via the LPWAN radio transceiver.

7. The method of claim 6, wherein the received signals include command signals instructing at least one of: (i) change a transmission frequency, (ii) change frequency of signal transmissions from the nodal seismic unit, (iii) change operating state, and (iv) change type of information transmitted by the nodal seismic unit.

8. A nodal seismic unit for acquiring seismic information, comprising:
   an enclosure;
   a GPS receiver disposed in the enclosure;
   a motion sensor disposed in the enclosure;
   a LPWAN radio transceiver disposed in the enclosure; and a control unit disposed in the enclosure, wherein the control unit is configured to transmit an unplanned movement signal to a remote operator using the LPWAN radio transceiver if: (i) the control unit receives a signal from the motion sensor indicative of an acceleration greater than a preset level and (ii) the signal from the motion sensor is not a predetermined signal indicative of a planned movement.

9. The nodal seismic unit of claim 8, wherein the preset level of acceleration is greater than an acceleration encountered during recording seismic data.

10. The nodal seismic unit of claim 8, wherein the control unit is further configured to transmit signals using a mesh radio.

11. The nodal seismic unit of claim 10, wherein the nodal seismic unit is configured to communicate with the remote operator via at least one other communication unit in signal communication with the mesh radio.

12. The nodal seismic unit of claim 8, wherein the control unit is further configured to transmit signals via a public LPWAN network.

13. The nodal seismic unit of claim 9, wherein the control unit is further configured to receive signals via the LPWAN radio transceiver.

14. The nodal seismic unit of claim 13, wherein the received signals include command signals instructing at least one of: (i) change a transmission frequency, (ii) change frequency of signal transmissions from the nodal seismic unit, (iii) change operating state, and (iv) change type of information transmitted by the nodal seismic unit.

* * * * *